US007410693B2

(12) United States Patent
de Ruiter

(10) Patent No.: US 7,410,693 B2
(45) Date of Patent: Aug. 12, 2008

(54) ADSORBING MATERIAL AND USE THEREOF

(75) Inventor: Ernest de Ruiter, Leverkusen (DE)

(73) Assignee: Blucher GmbH, Erkrath (DE)

(*) Notice: Subject to any disclaimer, the term of this patent is extended or adjusted under 35 U.S.C. 154(b) by 503 days.

(21) Appl. No.: 10/525,177

(22) PCT Filed: Aug. 5, 2003

(86) PCT No.: PCT/EP03/08649

§ 371 (c)(1),
(2), (4) Date: Feb. 22, 2005

(87) PCT Pub. No.: WO2004/020089

PCT Pub. Date: Mar. 11, 2004

(65) Prior Publication Data

US 2005/0266749 A1 Dec. 1, 2005

(30) Foreign Application Priority Data

Aug. 29, 2002 (DE) ................... 102 40 548

(51) Int. Cl.
*B32B 17/10* (2006.01)
*B05D 7/24* (2006.01)

(52) U.S. Cl. ............... 428/339; 428/332; 428/336; 427/379; 427/384

(58) Field of Classification Search ............. 428/423.1, 428/220, 332, 336, 339, 423.3, 425.1; 427/2.31, 427/372.2, 379, 384, 407.1

See application file for complete search history.

(56) References Cited

U.S. PATENT DOCUMENTS

| 4,194,041 A | 3/1980 | Gore et al. |
| 4,532,316 A | 7/1985 | Henn |
| 4,862,730 A | 9/1989 | Crosby |
| 4,872,220 A | 10/1989 | Haruvy et al. |
| 5,017,424 A | 5/1991 | Farnworth et al. |
| 5,024,594 A | 6/1991 | Athayde et al. |
| 5,391,426 A | 2/1995 | Wu |
| 5,743,775 A | 4/1998 | Baurmeister |
| 6,395,383 B1 | 5/2002 | Maples |

FOREIGN PATENT DOCUMENTS

| DE | 28 04 154 | 1/1979 |
| DE | 28 29 599 | 1/1980 |
| DE | 29 51 827 | 7/1981 |
| DE | 39 17 336 | 11/1990 |
| DE | 39 39 373 | 6/1991 |
| DE | 40 03 765 | 8/1991 |
| DE | 4003765 | 8/1991 |

(Continued)

*Primary Examiner*—Thao Tran
(74) *Attorney, Agent, or Firm*—Woodard, Emhardt, Moriarty, McNett & Henry LLP

(57) ABSTRACT

Disclosed is an adsorbing material (1), particularly for producing protective suits, comprising an especially planar supporting material (2), an at least substantially air-impermeable, steam-permeable barrier layer (3), and an adsorbing layer (4). The baffler layer (3) is applied to the supporting material (2) and is used as an adhesive layer for the adsorbing layer (4) that is disposed on the face of the barrier layer (3), which lies opposite the supporting material (2). The baffler layer (3) is provided with a steam permeability of at least 20 l/m² per 24 h at 25° C. and at a thickness of 50 µm.

16 Claims, 1 Drawing Sheet

FOREIGN PATENT DOCUMENTS

Figure 1:
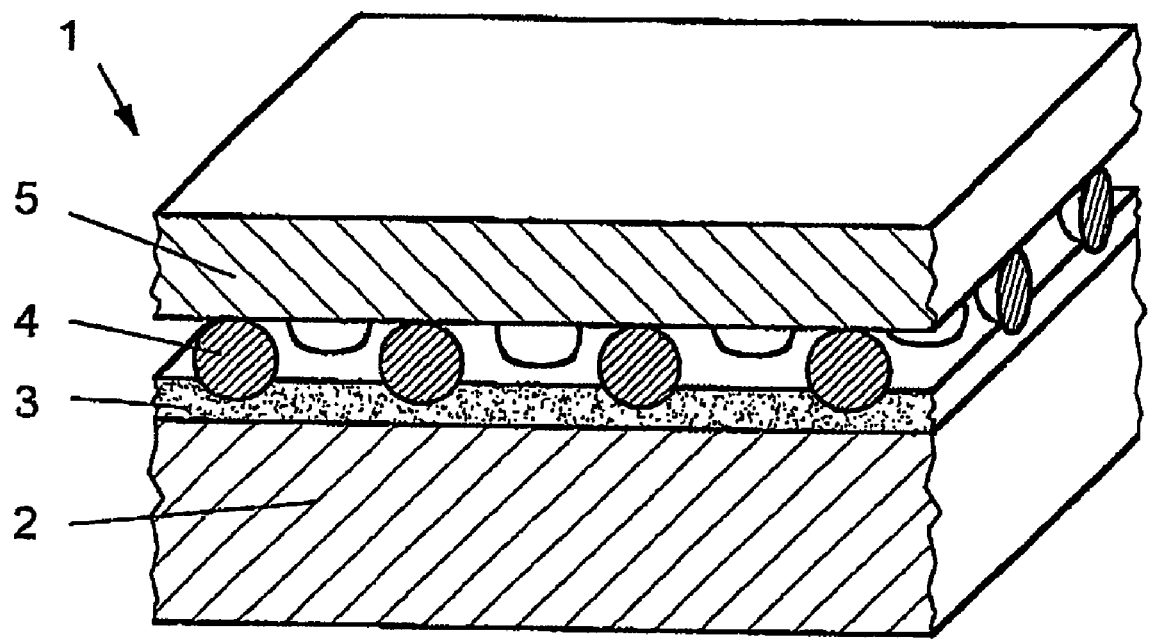

| | | |
|---|---|---|
| DE | 40 34 798 | 5/1992 |
| DE | 195 19 869 | 12/1996 |
| DE | 198 29 975 | 1/2000 |
| DE | 19829975 | 1/2000 |
| DE | 102 40 548 | 7/2005 |
| DE | 10240548 | 7/2005 |
| EP | 0 465 817 | 1/1992 |
| EP | 0 525 409 | 2/1993 |
| EP | 0525409 | 2/1993 |
| EP | 0 784 097 | 7/1997 |
| EP | 0 827 451 | 3/1998 |
| EP | 1531 929 | 5/2005 |
| GB | 2319971 | 6/1998 |
| WO | WO 94/01198 | 1/1994 |
| WO | WO 95/33007 | 12/1995 |
| WO | WO 96/373 365 | 11/1996 |
| WO | WO 96/37365 | 11/1996 |

ADSORBING MATERIAL AND USE THEREOF

CROSS-REFERENCE TO RELATED APPLICATIONS

The present application is the national stage of International Patent Application PCT/EP03/08649, filed Aug. 5, 2003, which claims the benefit of German Patent Application No. DE 10240548.4, filed Aug. 29, 2002, all of which are hereby incorporated by reference.

The present invention relates to an adsorbing material especially for the production of protective materials, such as protective suits, protective gloves, protective covers (to transport casualties) and the like, especially for NBC deployment, and also to processes for its production and to its use in the aforementioned protective materials.

There are a whole series of chemical entities which are absorbed by the skin and lead to serious physical harm. Examples include the vesicatory mustard gas Yellow Cross and the nerve gas sarin. People likely to come into contact with such poisons must wear a suitable protective suit or be protected against these toxins by suitable protective materials.

There are in principle three types of protective suits: air and water vapor impervious protective suits which are equipped with a layer of rubber impervious to chemical poisons, and which very rapidly lead to a buildup of heat; air and water vapor pervious protective suits which offer the highest wear comfort; and finally protective suits which are equipped with a membrane which is pervious to water vapor but not to the poisons mentioned.

Protective suits against chemical warfare agents that are intended for prolonged use under a wide variety of conditions must not lead to a heat buildup for the wearer. Therefore, mainly air pervious materials are utilized.

The air pervious, permeable protective suits generally possess an absorption layer based on activated carbon which binds the chemical poisons very durably, so that even strongly contaminated suits do not pose any danger whatsoever to the wearer. The great advantage of this system is that the activated carbon is accessible on the inside as well as the outside, so that poisons which have succeeded in penetrating at damaged or otherwise nontight locations are very rapidly adsorbed. Under extreme conditions, for example when a drop of a thickened poison lands from a considerable height on a somewhat open location on the outer material and is able to strike through to the carbon, however, the carbon layer may locally not be up to its task for a brief period.

The adsorbing layer in the air pervious, permeable protective suits described above is in most cases engineered such that either activated carbon particles up to about 1.0 mm in size on average are bonded onto an adhesive assembly printed onto a support, or else a reticulated PU foam impregnated with a "carbon paste" (i.e. binder plus activated carbon) is used as an adsorbing layer, in which case the adsorbing layer is generally complemented by an outer, i.e. a covering material, and the wearer-facing inside surface is covered with a lightweight textile material. Occasionally, however, there will also be composite materials comprising a sheetlike activated carbon structure, for example an activated carbon batt.

There are also protective suits which are equipped with a membrane which, although water vapor pervious for enhanced wear comfort, also acts as a barrier layer against liquids, especially toxic agents. Such a material is described for example in EP 0 827 451 A2. Protective suits having a membrane which is pervious to water vapor but impervious to poisons, especially contact poisons, have the disadvantage that poisons which have succeeded in penetrating at nontight locations remain in the interior of the protective suit and are absorbed through the skin of the wearer.

Applicant's own German Offenlegungsschrift DE 198 29 975 A1 describes adsorbing materials for protective suits having a polyurethane-based water vapor pervious membrane which also acts as a barrier layer against liquids and having an adsorbing layer based on activated carbon. However, the water vapor perviousness achieved with the materials described therein is not always satisfactory, especially not under extreme conditions of deployment.

The present invention then has for its object to provide an adsorbing or protective material which avoids the disadvantages described above and which is especially useful for the production of NBC protective materials, such as protective suits, protective gloves, protective covers and the like.

The present invention further has for its object to provide an adsorbing material, especially for use in protective materials, such as protective suits, protective gloves, protective covers and the like, which—as well as a water vapor pervious membrane which at least strongly retards or prevents the passage especially of chemical warfare and toxic agents (contact poisons for example)—comprises an adsorbing layer based on activated carbon. A certain degree of weight saving on the part of the adsorbing material is desired too.

The present invention further has for its object to provide an adsorbing material, especially for use in protective materials, such as protective suits, protective gloves, protective covers and the like, which ensures a high wear comfort.

The present invention finally further has for its object to further develop the adsorbing material described in the applicant's own German Offenlegungsschrift DE 198 29 975 A1.

By way of achievement of the object described above, the present invention proposes an adsorbing material. Further, advantageous embodiments of the adsorbing material of the present invention are the subject of respective subclaims.

The present invention further provides processes for producing the present invention's adsorbing material The present invention further provides for the use of the present invention's adsorbing material for producing protective materials, especially protective suits, protective gloves, protective covers (to transport casualties for example) and the like, preferably for NBC deployment.

The present invention finally further provides protective materials, such as protective suits, protective gloves, protective covers (to transport casualties for example) protective suits and the like, especially for NBC deployment, which are produced using the adsorbing material of the present invention.

The adsorbing material of the present invention comprises a barrier layer having an extremely high water vapor transmission rate of generally at least 20 l/m$^2$ per 24 h when 50 µm in thickness (measured by the inverted cup method of ASTM E 96 and at 25° C.) (for further details concerning the measurement of the water vapor transmission rate [WVTR] cf. also McCullough et al. "A comparison of standard methods for measuring water vapour permeability of fabrics" in *Meas. Sci. Technol. [Measurements Science and Technology]* 14, 1402-1408, August 2003). This ensures a particularly high wear comfort when the adsorbing material of the present invention is used in protective materials, as in protective suits, protective gloves, protective covers and the like.

When materials comprising activated carbon are used as adsorbing material to form the adsorbing layer, the already existing high wear comfort can be further enhanced, since the activated carbon serves as an intermediary moisture or water store and is able to buffer away moisture/water.

The fact that the barrier layer which offers permeation resistance to chemical poisons and especially warfare agents in that it prevents or at least retards the passage of chemical poisons also constitutes the bonding layer for the adsorbing layer, provides not only a not inconsiderable saving in basis weight, since an additional bonding layer is not required, but also for the same reason simplifies and thus improves the economics of the manufacturing operation, since no additional application of a separate bonding layer is required.

The carrier material, the adsorbing layer and the optional covering material somewhat reduce the water vapor transmission rate of the adsorbing material overall (compared with the pure barrier layer), but the water vapor transmission rate of the adsorbing material altogether is still very high and amounts to at least 10 l/m² per 24 h, especially at least 15 l/m² per 24 h and preferably at least 20 l/m² per 24 h when the barrier layer is 50 μm in thickness (at 25° C.).

On the other hand, the barrier layer of the adsorbing material according to the present invention has an extremely low water vapor transmission resistance $R_{et}$, in that the water vapor transmission resistance $R_{et}$ of the barrier layer under steady state conditions—measured according to DIN EN 31 092:1993 of February 1994 ("Textiles—Physiological Effects, Measurement of heat and water vapor transmission resistance under steady state conditions (sweating guarded-hotplate test)") or according to the prevalent international standard ISO 11 092—is at 35° C. generally not more than 25 (m²·pascal)/watt, especially not more than 20 (m²·pascal)/watt and preferably not more than 13 (m²·pascal)/watt when the barrier layer is 50 μm in thickness. The carrier material, the adsorbing layer and the optional covering material somewhat increase the water vapor transmission resistance $R_{et}$ of the adsorbing material in total (compared with the pure barrier layer, but the water vapor transmission resistance $R_{et}$ of the adsorbing material altogether under steady state conditions is still very low and amounts in general to not more than 30 (m²·pascal)/watt, especially not more than 25 (m²·pascal)/watt and preferably not more than 20 (m²·pascal)/watt when the barrier layer (3) is 50 μm in thickness.

The good wear properties of the adsorbing material according to the present invention are additionally enhanced by the buffering action of activated carbon when an adsorbing layer based on activated carbon is used, since the activated carbon acts as a moisture/water store or buffer. When for example activated carbon spherules are used as an adsorbent material for the adsorbing layer, add-ons of up to about 250 g/m² or more are customary, so that, for example in the event of sweating, about 40 g/m² of moisture can be stored and can then be released again by the barrier layer to the outside. A protective suit produced on the basis of such a material is thus theoretically capable of storing about 150 g of moisture.

The water vapor permeability of a compact, i.e., nonporous or continuous (uninterrupted), barrier layer always rests on the presence of hydrophilic segments as well. To achieve good moisture transportation coupled with but moderate swelling, the hydrophilic regions should be numerous but only possess a moderate water-binding capacity.

The barrier layer envisioned according to the present invention is thus a layer which is highly permeable to water vapor yet whose permeability to poisons or warfare agents is low. The barrier effect is enhanced by moisture imbibed by the barrier layer. But swellability in water should not be more than 35%.

The adsorbing material according to the present invention further exhibits good permeation resistance to chemical warfare agents, for example bis[2-chloroethyl] sulfide (also known as mustard gas, Hd or Yellow Cross). The permeation resistance offered by the adsorbing material according to the present invention to chemical warfare agents, especially bis [2-chloroethyl] sulfide, when measured at 30° C. according to CRDC-SP-84010, method 2.2, allows not more than 4 μg/cm² per 24 h, especially not more than 3.5 μg/cm² per 24 h, preferably not more than 3.0 μg/cm² per 24 h and more preferably not more than 2.5 μg/cm² per 24 h when the barrier layer is 50 μm in thickness.

A typical method of processing to produce the adsorbing material of the present invention looks as follows. The barrier layer envisioned according to the present invention is preferably produced using an aqueous dispersion consisting of a prepolymeric masked or blocked isocyanate (for example IMPRAPERM® VP LS 2329 from Bayer AG Leverkusen) and an isocyanate-reactive crosslinker (for example IMPRA-FIX® VP LS 2330 from Bayer AG Leverkusen). Further dispersions likewise suitable according to the present invention are described for example in EP 0 784 097 A1, the whole disclosure contents of which are hereby incorporated by reference. To ensure adequate storability for the dispersion, the reduced reactivity of the masked or blocked isocyanate group is a careful compromise; on the other hand, the hydrophilic segments must not lead to a more than moderate degree of swelling of the resulting barrier layer. Such dispersions can be applied as a very thin coat and penetrate only minimally into the carrier material, which is preferably oleophobicized (The oleophobicization of the carrier material has the advantage, first, that the warfare or toxic agents are rejected by, or to be more precise beaded off from, the ready-produced adsorbing material and, secondly, that the dispersion applied in the course of the production of the adsorbing material is only minimally taken up by the carrier material, if at all). This coating can then be dried without crosslinking, so that a very tacky, uninterrupted layer results on the carrier and is subsequently provided with adsorbents which finally form the adsorbing layer. Owing to the high initial adhesion, the adsorbents adhere where they land. The adhesive is subsequently crosslinked, for example at about 160 to 180° C., and it may be advantageous for the adsorbents at the same time to be pressed down, using a flat calender for example. After crosslinking of the adhesive material, the adsorbing layer may be additionally provided with a covering layer which is made to adhere with the aid of imprinted hotmelt dots or a hotmelt web for example. In a particular embodiment the crosslinking of the adhesive material and the laminating thereto of the covering layer may also be carried out simultaneously. The result is an inventive adsorbing material having a barrier layer based on a polyurethane (PU) membrane.

It is similarly possible according to the present invention to proceed alternatively to the method of processing described above and to apply the adsorbing layer to the still undried and still watery dispersion layer and only then to dry and crosslink the dispersion layer.

In a particular embodiment of the invention, the barrier layer of the adsorbing material according to the present invention may be formed as a multilayered laminate or as a multilayered composite, wherein the laminate or composite may in particular consist of at least two and preferably at least three interconnected layers or plies. This makes it possible to intercombine barrier layer materials each having different properties, especially different water vapor transmission rates and permeation resistances to warfare agents and thereby achieve an optimization of barrier layer properties. For example, in the case of a barrier layer consisting of three interconnected layers or plies, the core layer may be formed on the basis of a cellulose- or polyurethane-based polymer and the two respectively outer layers connected to the core layer may be formed on the basis of a polyurethane-, polyetheramide- and/or polyesteramide-based polymer, preferably on the basis of a polyurethane. In another refinement, the laminate or composite may for example comprise a core layer based on a polyurethane-based polymer and two outer layers connected to the core layers, which are likewise based on polyurethane, i.e., three interconnected layers or plies each based on polyurethane. In another, again further refinement, the laminate or composite may for example comprise a core layer based on a cellulose-based polymer and two outer layers connected to the core layer which are each based on a polyurethane. In this particular embodiment of the invention, wherein the barrier layer of the adsorbing material according to the present invention is formed as a multilayered laminate or as a multilayered composite, the core layer may advantageously be formed as a membrane 1 to 100 μm, especially 5 to 50 μm and preferably 10 to 20 μm in thickness and the two outer layers connected to the core layer may each advantageously be formed as a membrane 1 to 100 μm, especially 5 to 50 μm and preferably 5 to 10 μm in thickness.

As described above, there is an embodiment of the present invention where the adsorbing material according to the present invention may comprise a barrier layer based on a cellulose-based polymer. In a particularly preferred refinement of this embodiment, the barrier layer as previously described may be formed as a multilayered laminate or as a multilayered composite consisting of at least three interconnected layers or plies respectively, in which case, in this embodiment, the core layer may preferably be formed on the basis of a cellulose-based polymer and the two outer layers connected to the core layer each be formed on the basis of a polyurethane; the laminate or composite's first outer polyurethane-based layer applied atop the carrier material also serves as a bonding layer not only for the core layer but also for the carrier material, and the laminate or composite's second outer polyurethane-based layer which is applied atop the core layer and is remote from the carrier material also serves as a bonding layer for the adsorbing layer applied to that side of the barrier layer which is remote from the carrier material. The use of cellulose-based polymers to form the barrier layer especially as a core material layer and preferably in a composite with two polyurethane-based outer layers, has a series of advantages. First, cellulose and cellulose derivatives are excellent barrier layer materials especially with regard to chemical agents, such as warfare agents (Hd etc.), and are neither attacked nor dissolved by these materials, and secondly polyurethane-based outer layers prevent migration or diffusion of any plasticizers present in the core layer and also muffle the rustling which occurs in the course of wearing as a protective material and which is due to the cellulose-based core layer.

Particularly homogeneous, uniform barrier layers are obtained by the so-called "transfer process", i.e., when the composition forming the barrier layer (a PU dispersion for example) is initially applied to a removable or strippable release layer (a siliconized or waxed paper for example), subsequently dried and optionally crosslinked and then has applied to it a further layer which can then be adhered to the carrier material. After the release layer has been removed, that side of the film which was previously covered by the release layer (i.e., that side of the film which is remote from the carrier material) can then have applied to it a further layer (a PU dispersion for example) which also serves as a bonding layer for the adsorbing layer to be subsequently applied. Following application of the adsorbing layer and also drying and crosslinking of the barrier layer material with or without application of a covering material, an adsorbing material which is in accordance with the present invention is obtained as a result. The above-described embodiment of the process according to the present invention is thus especially useful to form multi-ply barrier layers in the form of a composite or laminate, for example barrier layers consisting of two or three or even more than three interconnected or -adhered polyurethane layers or plies. For further processing details in this regard, reference can also be made to claim 2.

The adsorbing layer may be formed using different adsorbents as defined in claims 13 to 16. When discrete particles of activated carbon, preferably in granule form ("granulocarbon") or spherical form ("spherocarbon"), are used to form the adsorbing layer, they preferably have measure of central tendency diameters for the activated carbon particles of <0.5 mm, preferably <0.4 mm, more preferably <0.35 mm, even more preferably <0.3 mm and most preferably ≦0.25 mm, but not less than 0.1 mm; the smaller activated carbon particles are preferable for applications requiring good adsorption kinetics and a low weight on the part of the adsorbing material, while the larger activated carbon particles are used especially whenever a larger adsorption capacity is required. By combining comparatively small and comparatively large activated carbon particles to form the adsorbing layer, both good adsorption kinetics and good adsorption capacity can be achieved. The same holds for a combination of activated carbon spheres and activated carbon fibers to form the adsorbing layer.

Figure 2:
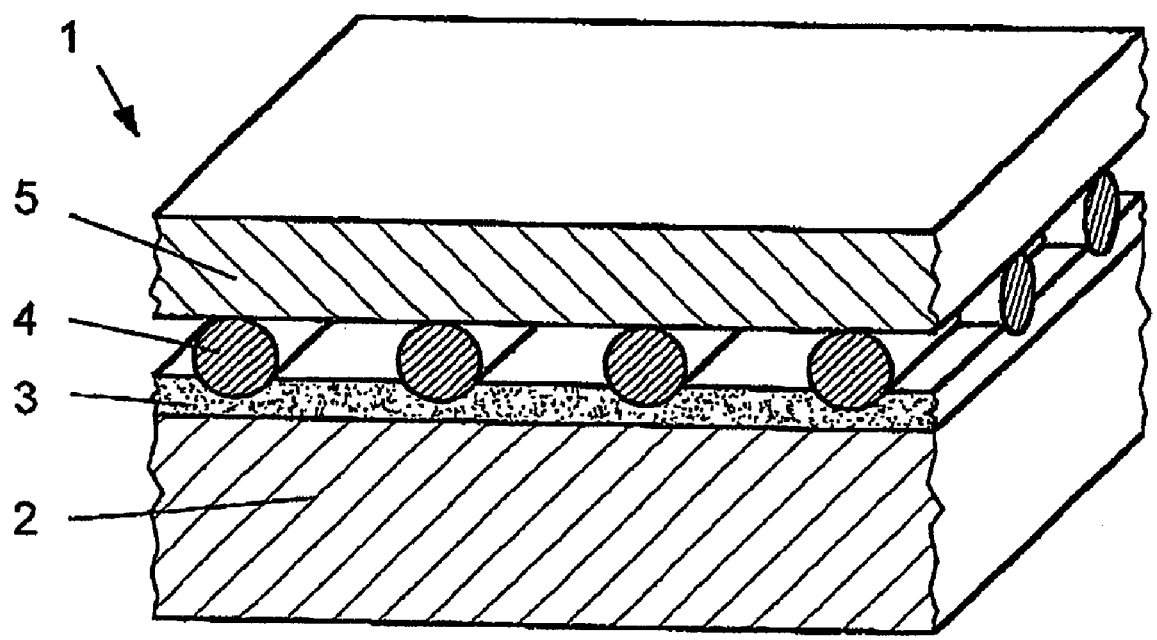

Further advantages, properties, aspects and features of the adsorbing material according to the present invention will become apparent from the following description of a preferred operative example of the present invention as depicted in the drawing, where FIG. 1 shows a schematic depiction of an adsorbing material according to a preferred operative example of the invention, comprising discrete activated carbon spherules as adsorbing layer;

FIG. 2 shows a schematic depiction of an adsorbing material according to a preferred operative example of the invention, comprising an activated carbon fabric as adsorbing layer.

FIGS. 1 and 2 shown an adsorbing material 1 as per a preferred operative example of the invention that is especially suitable for producing protective materials of any kind (for example protective suits, protective gloves, protective covers and the like). The adsorbing material 1 comprises an especially sheetlike carrier material 2, an at least essentially air impervious, water vapor pervious barrier layer 3 and an adsorbing layer 4, wherein the barrier layer 3 is atop the carrier material 2 and also serves as a bonding layer for the adsorbing layer 4 disposed on that side of the barrier layer 3 which is remote from the carrier material 2. In the embodiment as per FIG. 1, the adsorbing layer 4 is formed by discrete activated carbon spherules, whereas in the embodiment as per FIG. 2 the adsorbing layer is formed by an activated carbon fabric in the form of a woven fabric having warp and weft threads. The barrier layer 3 has in both cases a water vapor transmission rate of not less than 20 l/m² per 24 h when 50 μm thick (based on a temperature of 25° C. and measured by the inverse cup method. In either embodiment, a covering material 5 has been applied atop the adsorbing layer 4. For further details reference may be made to the above observations and also to the claims.

Further refinements, modifications and variations of the present invention will become apparent to and realizable by the ordinarily skilled after reading the description without their having to go outside the realm of the present invention.

The present invention is illustrated by the following operative examples which do not restrict the present invention in any way, however.

OPERATIVE EXAMPLES

Example 1

A dispersion of a masked or blocked diisocyanate with the associated crosslinker (diisocyanate: IMPRAPERM® VP LS 2329 from Bayer AG Leverkusen and crosslinker: IMPRAFIX® VP LS 2330 from Bayer AG Leverkusen) is doctor coated onto an oleophobicized outer fabric (carrier material) in an amount of about 60 g/m$^2$ and dried at about 100° C. Drying leads to the formation of an uninterrupted tacky film of a prepolymeric polyurethane. This film, after it has been crosslinked, will prevent the direct breakthrough of toxic or warfare agents, or strongly retard their penetration, and distribute them over a larger area.

This tacky film then has the adsorbing layer applied to it. The adsorbing layer can consist either of a woven activated carbon fabric or some other activated carbon fabric having a basis weight of preferably 50 to 100 g/m$^2$ or of discrete activated carbon spherules having measure of central tendency diameters $\leq 0.3$ mm in an amount of about 100 g/m$^2$.

The adsorbing layer subsequently is covered with a lightweight textile (circa 15 to 30 g/m$^2$) which is laminated on by means of a hotmelt web. In the course of this lamination, the temperature has to attain at least 160° C. in order that the blocked isocyanate groups may be deblocked and the crosslinking may be initiated.

The result is an adsorbing material which is in accordance with the present invention and which comprises an essentially air impervious, water vapor pervious barrier layer based on a PU membrane which has a 25° C. water vapor transmission rate of not less than 20 l/m$^2$ per 24 h when 50 µm thick and also serves as a bonding material for the adsorbing layer (activated carbon fabric or discrete activated carbon spherules) disposed on that side of the barrier layer which is remote from the carrier material. The adsorbing material thus produced is especially useful for producing protective materials of any kind, especially for producing protective suits, protective gloves, protective covers and the like.

Example 2

A dispersion of a masked or blocked diisocyanate with the related crosslinker (diisocyanate: IMPRAPERM® VP LS 2329 from Bayer AG Leverkusen and crosslinker: IMPRAFIX® VP LS 2330 from Bayer AG Leverkusen) is doctor coated onto a siliconized paper in an amount of about 15 g/m$^2$ and dried and crosslinked at about 160° C. to about 180° C. to form a film. This dried and cross-linked film is doctor coated with the aforementioned dispersion in an amount of about 15 g/m$^2$ and dried at about 100° C. Drying is accompanied by the formation of a tacky, impervious film of a prepolymeric polyurethane. The still tacky film then has applied to it an oleophobicized outer fabric (carrier material) before curing by heating to temperatures between about 160° C. and about 180° C. and subsequently removing the siliconized paper.

That side of the previously generated polyurethane film which was previously covered by the siliconized paper is doctor coated with the aforementioned dispersion in an amount of about 15 g/m$^2$ before drying at about 100° C. to form an uninterrupted, tacky film of a prepolymeric polyurethane to which the adsorbing layer is subsequently applied. The adsorbing layer can consist either of a woven activated carbon fabric or some other activated carbon fabric having a basis weight of preferably 50 to 100 g/m$^2$ or of discrete activated carbon spherules having measure of central tendency diameters $\leq 0.3$ mm in an amount of about 100 g/m$^2$. The adsorbing layer subsequently is covered with a lightweight textile (circa 15 to 30 g/m$^2$) which is laminated on by means of a hotmelt web. In the course of this lamination, the temperature has to attain at least 160° C. in order that the blocked isocyanate groups may be deblocked and the crosslinking may be initiated. The result is an adsorbing material which is in accordance with the present invention and which comprises an essentially air impervious, water vapor pervious barrier layer based on a PU composite membrane or a PU laminate based on three interconnected PU layers having a 25° C. water vapor transmission rate of not less than 20 l/m$^2$ per 24 h when 50 µm thick. The adsorbing material thus produced is especially useful for producing protective materials of any kind, especially for producing protective suits, protective gloves, protective covers and the like.

Example 3

A similar method is used to apply a polyurethane membrane to a siliconized paper via an air knife system:

The siliconized paper initially has applied to it a first layer ("top coat", basis weight: about 60 to 62 g/m$^2$). This first layer is produced starting from 100 parts of polyurethane dispersion (IMPRAPERM® VP LS 2329), 1.8 parts of crosslinker (IMPRAFIX® VP LS 2330), 0.5 part of ammonia (25%), 2 parts of titanium dioxide (Mirox® AM), 10 parts of Impranil® DLF (Dispersion, Bayer AG Leverkusen), a further 2.5 parts of another titanium dioxide (Acematt® OK 41), 1 part of Baysilon® OL 17 (Bayer AG Leverkusen) and 12 parts of water. After application, everything is dried at 100° C. to give a first layer "top coat".

This first layer then has doctor coated onto it a second layer which also serves as bonding layer for the adsorbing layer ("bonding coat", basis weight: about 60 to 62 g/m$^2$). This second layer is produced starting from 100 parts of polyurethane dispersion (IMPRAPERM® VP LS 2329), 1.8 parts of crosslinker (IMPRAFIX® VP LS 2330), 0.5 part of ammonia (25%) and 20 parts of titanium dioxide (Mirox® AM). After application, everything is dried at 100° C. to form a two-layered membrane consisting of a first layer "top coat" and a second layer "bonding coat".

The second layer "bonding coat" is subsequently covered with 100 g/m$^2$ of spherulous activated carbon ("spherocarbon", measure of central tendency diameter: about 0.1 to 0.28 mm). The polyurethane is subsequently crosslinked at 160° C. and the resulting activated carbon coated two-layer membrane barrier layer is detached from the silicone paper and secured to a textile carrier (Nomex® knit, a loop-drawingly knitted fabric based on heteroaramide fibers) to test the performance characteristics of the barrier layer:

water vapor transmission resistance $R_{et}$ to DIN EN 31 092: 1993 (February 1994) or ISO 11 092: 19.9 (m$^2$·pascal)/watt permeation resistance to mustard gas measured to CRDC-SP-84010, method 2.2: 1.12 µg/cm$^2$ per 24 h.

Example 4

A similar method was used to apply a one-ply or one-layered polyurethane membrane by means of an air knife system to 50/50 cotton/PES blend fabric:

Initially, a polyurethane layer (basis weight: about 36 g/m$^2$), which also serves as bonding layer for the adsorbing layer, is applied, or knife coated, onto the fabric, starting from 100 parts of polyurethane dispersion (IMPRAPERM® VP LS 2329), 4.4 parts of crosslinker (IMPRAFIX® VP LS 2330), 4 parts of PP thickener (NBA) and 30 parts of water. After application, everything is dried at 100° C.

The dried layer is subsequently covered with 50 g/m$^2$ of spherulous activated carbon ("spherocarbon", measure of central tendency diameter: about 0.1 to 0.28 mm). The polyurethane is subsequently crosslinked at 160° C. The properties of the material are as follows:

water vapor transmission resistance $R_{et}$ to DIN EN 31 092: 1993 (February 1994) or ISO 11 092: 21 (m$^2$·pascal)/watt permeation resistance to mustard gas measured to CRDC-SP-84010, method 2.2: 3.9 µg/cm$^2$ per 24 h.

What is claimed is:

1. An adsorbing material for producing protective materials, said adsorbing material comprising:
    a sheet-like carrier material;
    an at least essentially air-impervious, water-vapor-pervious barrier layer;
    wherein the barrier layer forms a continuous, uninterrupted layer on the carrier material, the thickness of the barrier layer being in the range from 1 to 500 µm, and
    wherein the barrier layer is permeation resistant to chemical poisons and warfare agents in that it prevents or at least retards the passage of chemical poisons and warfare agents; and
    an adsorbing layer based on activated carbon,
    wherein the barrier layer is atop the carrier material and also serves as a bonding layer for the adsorbing layer disposed on that side of the barrier layer which is remote from the carrier material and wherein the barrier layer is formed as a multilayered laminate or as a multilayered composite comprising at least three interconnected layers or plies, and
    wherein the multilayered laminate or the multilayered composite comprises a core layer and two outer layers connected to the core layer, the corner layer being formed on the basis of a cellulose- or polyurethane-based polymer and the two outer layers connected to the core layer being formed on the basis of a polyurethane.

2. The adsorbing material according to claim 1, wherein the core layer is formed as a membrane 1 to 100 µm in thickness and wherein the two outer layers connected to the core layer are each formed as a membrane 1 to 100 µm in thickness.

3. The adsorbing material according to claim 1, wherein the barrier layer has a 25° C. water vapor transmission rate of at least 20 l/m$^2$ per 24 h when 50 µm in thickness and wherein the adsorbing material has a 25° C. water vapor transmission rate of at least 10 l/m$^2$ per 24 h when the barrier layer is 50 µm in thickness.

4. The adsorbing material according to claim 1, wherein the carrier material is an air-pervious textile material and has a basis weight in the range from 50 to 300 g/m$^2$.

5. The adsorbing material according to claim 1, wherein the barrier layer is applied in amounts from 1 to 250 g/m$^2$, based on the dry weight of the barrier layer.

6. The adsorbing material according to claim 1, wherein the adsorbing layer comprises discrete activated carbon particles in granular or spherical form having medium diameters of the activated carbon particles of <0.5 mm.

7. The adsorbing material according to claim 6, wherein the adsorbing material includes the activated carbon particles in an amount from 5 to 500 g/m$^2$ and wherein the activated carbon particles have an internal surface area (BET) in the range from 800 to 1500 g/m$^2$.

8. The adsorbing material according to claim 1, wherein the adsorbing layer comprises activated carbon fibers in the form of an activated carbon fabric, said activated carbon fabric having a basis weight in the range from 20 to 200 g/m$^2$.

9. The adsorbing material according to claim 1, wherein the adsorbing layer is additionally impregnated with at least one catalyst selected from the group consisting of enzymes and metal ions, the amount of catalyst being in the range from 0.05% to 12% by weight, based on the weight of the adsorbing layer.

10. The adsorbing material according to claim 1, wherein the adsorbing material has a steady state water vapor transmission resistance $R_{et}$, measured according to DIN EN 31 092: 1993 (February 1994) and ISO 11 092, at 35° C. of not more than 30 (m$^2$·pascal)/watt when the barrier layer is 50 µm in thickness.

11. Protective material, said protective material comprising an adsorbing material according to claim 1.

12. The protective material according to claim 11, wherein the protective material is selected from the group consisting of protective suits, protective gloves and protective covers.

13. An adsorbing material for producing protective materials, said adsorbing material comprising:
    a sheet-like carrier material;
    an at least essentially air-impervious, water-vapor-pervious barrier layer,
    wherein the barrier layer forms a continuous, uninterrupted layer on the carrier material, the thickness of the barrier layer being in the range from 1 to 500 µm, and
    wherein the barrier layer is permeation resistant to chemical poisons and warfare agents in that it prevents or at least retards the passage of chemical poisons and warfare agents; and
    an adsorbing layer based on activated carbont,
    wherein the barrier layer is atop the carrier material and also serves as a bonding layer for the adsorbing layer disposed on that side of the barrier layer which is remote from the carrier material and wherein the barrier layer is formed as a multilayered laminate or as a multilayered composite comprising at least three interconnected layers or plies,
    wherein the multilayered laminate or the multilayered composite comprises a core layer and two outer layers connected to the core layer, the core layer being formed on the basis of a cellulose- or polyurethane-based polymer and the two outer layers connected to the core layer being formed on the basis of a polyurethane,
    said adsorbing material offering permeation resistance to the chemical warfare agent bis-[2-chloroethyl]-sulfide (mustard gas), measured according to CRDC-SP-84010, method 2.2, allowing not more than 4 µg/cm$^2$ per 24 h when the barrier layer is 50 µm in thickness.

14. A process for producing an adsorbing material according to claim 1, said process comprising the following steps:
    (a) providing a carrier material in continuous sheet form; then
    (b) applying an aqueous dispersion comprising an isocyanate and an isocyanate-reactive crosslinker to the carrier material; then
    (c) predrying the dispersion applied in step (b) until the water is removed, wherein the predrying temperatures are below the crosslinking temperature of the dispersion and amount to about 80° C. to 120° C., to form a continuous uninterrupted tacky layer or film which also serves as a bonding layer for the layer or membrane based on a cellulose-based polymer to be applied in subsequent step (d); then (d) applying a layer or membrane based on a cellulose-based polymer to the still tacky bonding layer generated in step (c); then (e) applying an aqueous dispersion comprising an isocyanate and an isocyanate-reactive crosslinker to the step (d) applied layer or membrane based on a cellulose-based polymer; then (f) optionally, predrying the dispersions applied in step (b) until the water is removed, wherein the predrying temperatures are below the crosslinking temperature of the dispersion and amount to about 80° C. to 120° C., to form a continuous uninterrupted tacky layer or film which also serves as a bonding layer for the adsorbing layer to be applied in subsequent step (g); then (g) applying the adsorbing layer to the step (e) applied layer, consisting of the dispersion, or else to the step (f) generated, still tacky bonding layer; then (h) drying and crosslinking the dispersion or the still tacky bonding layer by heating to above the crosslinking temperature at temperatures of 140 to 180° C. or more, to form a barrier layer supporting the adsorbing layer applied thereto; then (i) optionally, applying a covering material to the adsorbing layer.

15. A process for producing an adsorbing material according to claim 13, said process comprising the following steps:

(a) providing a carrier material in continuous sheet form; then (b) applying an aqueous dispersion comprising an isocyanate and an isocyanate-reactive crosslinker to the carrier material; then (c) predrying the dispersion applied in step (b) until the water is removed, wherein the predrying temperatures are below the crosslinking temperature of the dispersion and amount to about 80° C. to 120° C., to form a continuous uninterrupted tacky layer or film which also serves as a bonding layer for the layer or membrane based on a cellulose-based polymer to be applied in subsequent step (d); then (d) applying a layer or membrane based on a cellulose-based polymer to the still tacky bonding layer generated in step (c); then (e) applying an aqueous dispersion comprising an isocyanate and an isocyanate-reactive crosslinker to the step (d) applied layer or membrane based on a cellulose-based polymer; then (f) optionally, predrying the dispersions applied in step (b) until the water is removed, wherein the predrying temperatures are below the crosslinking temperature of the dispersion and amount to about 80° C. to 120° C., to form a continuous uninterrupted tacky layer or film which also serves as a bonding layer for the adsorbing layer to be applied in subsequent step (g); then (g) applying the adsorbing layer to the step (e) applied layer, consisting of the dispersion, or else to the step (f) generated, still tacky bonding layer; then (h) drying and crosslinking the dispersion or the still tacky bonding layer by heating to above the crosslinking temperature at temperatures of 140 to 180° C. or more, to form a barrier layer supporting the adsorbing layer applied thereto; then (i) optionally, applying a covering material to the adsorbing layer.

16. A process for producing an adsorbing material according to claim 1, said process comprising the following steps:

(a) providing a release layer in the form of a siliconized or waxed release paper; then (b) applying an aqueous dispersion comprising isocyanate and an isocyanate-reactive crosslinker to the release layer; then (c) predrying the step (b) applied layer, consisting of the dispersion, until the water is removed, with or without crosslinking; then (d) renewedly applying an aqueous dispersion comprising an isocyanate and an isocyanate-reactive crosslinker to the step (c) produced, dried and optionally crosslinked layer; then (e) optionally predrying the step (d) produced second layer until the water is removed, and applying a carrier material in continuous sheet form to the second layer obtained in step (d); then (f) optionally predrying the step (d) applied second layer until the water is removed, with or without crosslinking; then (g) removing the release layer; then (h) renewedly applying an aqueous dispersion comprising isocyanate and an isocyanate-reactive crosslinker to that side of the dried and optionally crosslinked layer obtained in step (c) that was previously covered with the release layer; then (i) optionally predrying the dispersions applied in step (h) until the water is removed, the predrying temperatures being below the crosslinking temperature of the dispersion and amounting to about 80° C. to 120° C., to form a continuous uninterrupted tacky layer or film which also serves as bonding layer for the adsorbing layer to be applied in subsequent step (j); then (j) applying the adsorbing layer to the step (h) applied layer, consisting of the dispersion, or else to the step (i) generated, still tacky bonding layer; then (k) drying and crosslinking the dispersion or the still tacky bonding layer by heating to above the crosslinking temperature at temperatures of 140 to 180° C. or more, to form a barrier layer based on a laminate or composite of three interconnected polyurethane layers supporting the adsorbing layer applied thereto; then (l) optionally, applying a covering material to the adsorbing layer.

* * * * *

UNITED STATES PATENT AND TRADEMARK OFFICE
CERTIFICATE OF CORRECTION

| | |
|---|---|
| PATENT NO. | : 7,410,693 B2 |
| APPLICATION NO. | : 10/525177 |
| DATED | : August 12, 2008 |
| INVENTOR(S) | : Ernest de Ruiter |

Page 1 of 1

It is certified that error appears in the above-identified patent and that said Letters Patent is hereby corrected as shown below:

Column 9, line 42, the word "corner" should be replaced with --core--

Column 10, line 37, the word "carbont" should be replaced with --carbon--

Signed and Sealed this

Thirtieth Day of September, 2008

JON W. DUDAS
*Director of the United States Patent and Trademark Office*